`US011408750B2`

(12) United States Patent
St. Romain et al.

(10) Patent No.: US 11,408,750 B2
(45) Date of Patent: Aug. 9, 2022

(54) PRIORITIZING COLLECTING OF INFORMATION FOR A MAP

(71) Applicant: Toyota Research Institute, Inc., Los Altos, CA (US)

(72) Inventors: Randall J. St. Romain, Ann Arbor, MI (US); Schuyler H. Cohen, Ann Arbor, MI (US)

(73) Assignee: Toyota Research Institute, Inc., Los Altos, CA (US)

( * ) Notice: Subject to any disclaimer, the term of this patent is extended or adjusted under 35 U.S.C. 154(b) by 192 days.

(21) Appl. No.: 16/914,842

(22) Filed: Jun. 29, 2020

(65) Prior Publication Data
US 2021/0404829 A1    Dec. 30, 2021

(51) Int. Cl.
| | | |
|---|---|---|
| *G01C 21/36* | (2006.01) | |
| *G01C 21/34* | (2006.01) | |
| *G08G 1/01* | (2006.01) | |
| *H04W 4/021* | (2018.01) | |
| *G06F 16/23* | (2019.01) | |

(52) U.S. Cl.
CPC ....... *G01C 21/367* (2013.01); *G01C 21/3461* (2013.01); *G01C 21/3484* (2013.01); *G01C 21/3492* (2013.01); *G08G 1/0145* (2013.01); *G06F 16/23* (2019.01); *H04W 4/021* (2013.01)

(58) Field of Classification Search
CPC .............. G01C 21/367; G01C 21/3461; G01C 21/3484; G01C 21/3492; G08G 1/0145; G06F 16/23; H04W 4/021
See application file for complete search history.

(56) References Cited

U.S. PATENT DOCUMENTS

| | | | |
|---|---|---|---|
| 7,606,579 B2 | 10/2009 | Thacher | |
| 8,670,933 B2 | 3/2014 | Schenken et al. | |
| 8,983,762 B2 | 3/2015 | Davidson | |
| 9,402,189 B2 | 7/2016 | Hohs et al. | |
| 9,506,771 B2 | 11/2016 | Santilli et al. | |
| 9,734,455 B2 | 8/2017 | Levinson et al. | |
| 9,928,743 B2 | 3/2018 | Eilertsen | |
| 10,062,281 B1 * | 8/2018 | Brookins | G08G 1/0141 |
| 10,793,160 B2 * | 10/2020 | Palmer | B60W 40/08 |
| 10,816,993 B1 * | 10/2020 | Tran | G05D 1/0088 |
| 10,818,175 B2 * | 10/2020 | Brookins | G08G 1/096716 |
| 10,928,830 B1 * | 2/2021 | Tran | B60W 30/12 |

(Continued)

FOREIGN PATENT DOCUMENTS

WO      2017/180382 A1    10/2017

*Primary Examiner* — Luis A Martinez Borrero
(74) *Attorney, Agent, or Firm* — Oblon, McClelland, Maier & Neustadt, L.L.P.

(57) ABSTRACT

A host map system for updating a region of a host map based on sensor data received from a plurality of connected vehicles travelling in the region comprises monitoring a host map region for discrepancies, defining a geo-fence around an area of a discrepancy and setting a schedule for activing the geo-fence. When a connected vehicle enters the geo-fence, the host mapping system transmits the geo-fence to the connected vehicle and requests that it share its sensor data while travelling in the geo-fenced area. The host mapping system receives the sensor data and processes the data to update details of the host map. The host mapping system may transmit the updated map to connected vehicles travelling in the map region.

20 Claims, 11 Drawing Sheets

(56) References Cited

U.S. PATENT DOCUMENTS

| | | | |
|---|---|---|---|
| 10,955,855 B1* | 3/2021 | Tran | G05D 1/0246 |
| 10,992,755 B1* | 4/2021 | Tran | G06Q 50/30 |
| 11,222,531 B2* | 1/2022 | Mubarek | G08G 1/0129 |
| 2007/0112503 A1* | 5/2007 | Johnson | G08G 1/0104 701/469 |
| 2015/0127239 A1* | 5/2015 | Breed | G06T 7/73 701/70 |
| 2016/0223355 A1* | 8/2016 | Habib | G01C 21/3667 |
| 2016/0253642 A1* | 9/2016 | Efird | G06Q 10/0835 705/34 |
| 2016/0259814 A1* | 9/2016 | Mizoguchi | G06F 16/29 |
| 2018/0025632 A1* | 1/2018 | Breed | G09B 29/106 701/93 |
| 2018/0068567 A1 | 3/2018 | Gong et al. | |
| 2019/0056231 A1 | 2/2019 | Bai et al. | |
| 2019/0271550 A1* | 9/2019 | Breed | F21S 41/13 |
| 2019/0295003 A1 | 9/2019 | Dronen et al. | |
| 2020/0074575 A1* | 3/2020 | Efird | B60L 58/10 |
| 2020/0103233 A1* | 4/2020 | McErlean | G01C 21/28 |
| 2020/0192403 A1* | 6/2020 | Silver | G01S 13/95 |
| 2020/0393261 A1* | 12/2020 | Zhang | G08G 1/0133 |
| 2020/0394838 A1* | 12/2020 | Bulan | G01C 21/3852 |
| 2021/0004017 A1* | 1/2021 | Colgate | G01C 21/3807 |
| 2021/0074156 A1* | 3/2021 | Brookins | G08G 1/0112 |
| 2021/0108926 A1* | 4/2021 | Tran | G06N 3/04 |
| 2021/0156704 A1* | 5/2021 | Gibson | G01C 21/3848 |
| 2021/0199437 A1* | 7/2021 | Breed | G06N 3/02 |
| 2021/0233390 A1* | 7/2021 | Georgiou | G08G 1/04 |
| 2021/0396528 A1* | 12/2021 | St. Romain | G01C 21/3453 |
| 2022/0011120 A1* | 1/2022 | St. Romain | G08G 1/20 |

\* cited by examiner

PRIORITIZING COLLECTING OF INFORMATION FOR A MAP

BACKGROUND

Technical Field

The present disclosure is directed to methods and a system for gathering updated data from vehicles to update an electronic map.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

With the advent of autonomous and semi-autonomous vehicles, navigational mapping has become essential in recent years.

Accurate map information is essential for autonomous or semi-autonomous driving control to be performed. However, the map information may become outdated due to topographic changes (for example, potholes, construction causing changes in lane width, road curvature or the like), emergency situations (for example, accidents, animals in the roadway, oil spills, or the like), non-working traffic lights, criminal activities (for example, stolen road signs, defacing of the roadway, vandalism, or the like), closure of roadways due to flooding, icy conditions or snow at different seasons, and the like.

A region on a map can be defined by a geo-fence. A geo-fence is a virtual perimeter of a real world geographic area. A geo-fence can be dynamically generated by specifying a radius around a point location, or by a set of coordinates which define the shape of the geo-fenced area.

A vehicle entering or exiting the geo-fence can be identified by at least one of GPS data, transmissions from onboard communication unit within the vehicle to a map server or by connection with a communication device, such as a smart phone of a passenger, to the map server. The transmissions may be from a computer application stored in a passenger's smart phone or within the vehicle's onboard communication system, or computer software stored in the vehicle's computing system to the map server. A vehicle which includes an onboard communication unit is called a "connected vehicle" and may be autonomous, semi-autonomous or non-autonomous.

As more vehicles become equipped with sensors, such as cameras, LiDAR, radar and the like, and further include onboard communication devices which are capable of transmitting data to and from a map server at high data rates, high definition maps can be developed using the sensor data, which may or may not be overlaid on an existing GPS map. These maps must be updated to correct changes in the roadways.

Accordingly, it is one object of the present disclosure to provide methods and systems for updating a geo-fenced area of an existing map with sensor data sourced from connected vehicles entering the geo-fenced area. The geo-fence may have a temporal component in which the geo-fence is only active at scheduled times which takes advantage of traffic variations and interactions between vehicles.

SUMMARY

The embodiments of the present disclosure describe an improvement in map updating in which automatic collection of sensor data in a specific area, during a specific time of day and schedule, captures traffic changes and interactions between vehicles.

In an exemplary embodiment, a host mapping system configured to update a region of a host map based on sensor data received from a plurality of connected vehicles travelling in the region is described, comprising a transceiver configured to receive location area signals from the plurality of connected vehicles travelling in the region, a computing processing unit (CPU) including processing circuitry configured to execute program instructions stored on a computer-readable medium causing the processing circuitry to monitor vehicle traffic activity in the region based on the location area signals, determine whether a discrepancy exists between the vehicle traffic activity and expected vehicle traffic activity based on the host map, when no discrepancy exists, continue monitoring vehicle traffic activity, when a discrepancy exists, determine a map area of the discrepancy and determine a first schedule for requesting first sensor data from the plurality of connected vehicles, surround the map area of the discrepancy with a first geo-fence, wherein the first geo-fence is configured to activate based on the first schedule, receive an alert when a connected vehicle enters the first geo-fence, transmit the first geo-fence to the connected vehicle, request that the connected vehicle transmit the first sensor data while travelling in the map area of the first geo-fence, receive the first sensor data from each connected vehicle travelling in the map area of the first geo-fence, compare the first sensor data to the first geo-fenced area of the map, identify the discrepancy, update the host map, and transmit the update to the plurality of connected vehicles travelling in the map region.

In another exemplary embodiment, a method for updating a region of a host map based on sensor data received from a plurality of connected vehicles travelling in the region is described, comprising receiving location area signals from the plurality of connected vehicles travelling in the region, monitoring, with processing circuitry, vehicle traffic activity in the region based on the location area signals, determining whether a discrepancy exists between the vehicle traffic activity and expected vehicle traffic activity based on the host map, continuing to monitor vehicle traffic activity when no discrepancy exists, determining a map area of the discrepancy and determine a first schedule for requesting first sensor data from the plurality of connected vehicles when a discrepancy exists, surrounding the map area of the discrepancy with a first geo-fence, wherein the first geo-fence is configured to activate based on the first schedule, receiving an alert when a connected vehicle enters the first geo-fence, transmitting the first geo-fence to the connected vehicle, requesting that the connected vehicle transmit first sensor data while travelling in the map area of the first geo-fence, receiving the first sensor data from each connected vehicle travelling in the map area of the first geo-fence, comparing the first sensor data to the first geo-fenced area of the map, identifying the discrepancy, updating the host map, and transmitting the update to the plurality of connected vehicles travelling in the map region.

In another exemplary embodiment, a non-transitory computer readable medium having instructions stored therein that, when executed by one or more processors, cause the one or more processors to perform a method for updating a region of a host map based on sensor data received from a plurality of connected vehicles travelling in the region is described, comprising receiving location area signals from the plurality of connected vehicles travelling in the region, monitoring, with processing circuitry, vehicle traffic activity in the region based on the location area signals, determining whether a discrepancy exists between the vehicle traffic activity and expected vehicle traffic activity based on the host map, continuing to monitor vehicle traffic activity when no discrepancy exists, determining a map area of the discrepancy and determine a first schedule for requesting first sensor data from the plurality of connected vehicles when a discrepancy exists, surrounding the map area of the discrepancy with a first geo-fence, wherein the first geo-fence is configured to activate based on the first schedule, receiving an alert when a connected vehicle enters the first geo-fence, transmitting the first geo-fence to the connected vehicle, requesting that the connected vehicle transmit first sensor data while travelling in the map area of the first geo-fence, receiving the first sensor data from each connected vehicle travelling in the map area of the first geo-fence, comparing the first sensor data to the first geo-fenced area of the map, identifying the discrepancy, updating the host map, and transmitting the update to the plurality of connected vehicles travelling in the map region.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
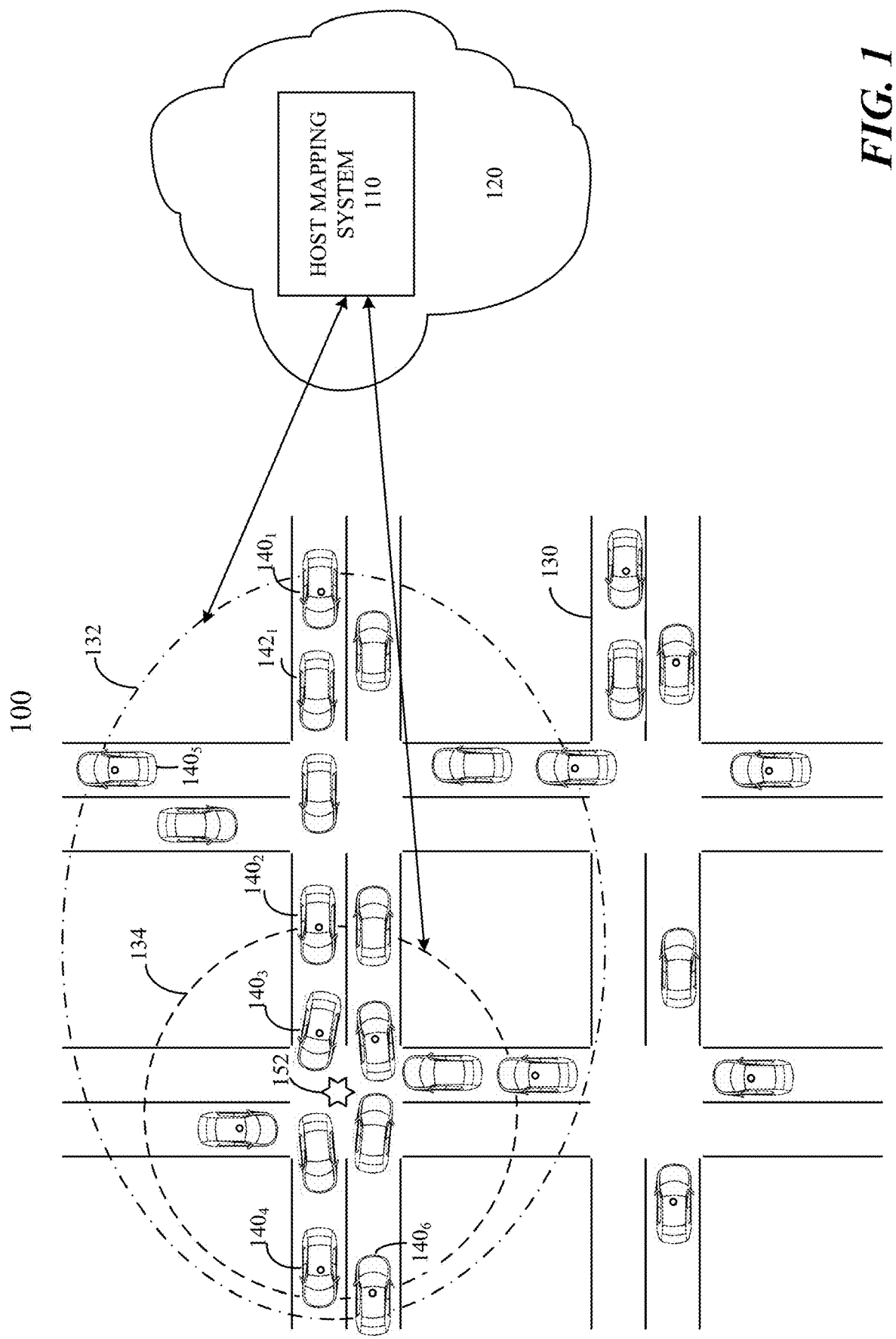
FIG. 1 is an illustration of the mapping environment, according to certain embodiments.

In the drawings, like reference numerals designate identical or corresponding parts throughout the several views.

Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Geo-fencing is a location-based service in which an app or other software uses GPS, Wi-Fi or cellular data to trigger a pre-programmed action when a mobile device enters or exits a virtual boundary set up around a geographical location.

Aspects of the present disclosure describe a host mapping system including map data that puts a geo-fence around a certain area of the map where there is incomplete or potentially incorrect map information. The host mapping system is able to communicate with vehicles entering the geo-fence to collect their sensor data regarding the area and then provide this area back to the mapping system for analysis. The data collected by the vehicles could include accelerometer, velocity, images from camera sensors, point cloud data from LIDAR sensors, radar data and the like.

The geo-fence may have a temporal component, wherein the geo-fence is only activated during certain times of the day, such as times where there is significant traffic. By so doing, the host mapping system can gather information during times when vehicles are forced to interact with each other. For example, monitoring traffic at a stop sign at 3 AM may not give an accurate picture of how vehicles act at the stop sign as when there is more traffic present. As such, the geo-fence can be set to be active only during the daylight hours or during rush hours.

Aspects of the present disclosure describe the automatic collection of data in the geo-fenced area during a specific time schedule so as to capture interactions between vehicles. The time schedule may be determined by an initial period of monitoring to establish the hours and days of interest. Additionally, the time schedule may include setting and monitoring the geo-fenced area during events, such as holidays, gatherings, sports events, or the like.

Each vehicle has a portion of the map relevant to its current navigation goals. A host mapping system distributes relevant map information to each vehicle based on the navigation plan over a cellular network, WiFi or an RF communication band.

The owner of the host mapping system may purchase an RF communication band over which the vehicle communicates, which would eliminate the need for a subscription to the host mapping system.

Alternatively, the connected vehicle may be a registered subscriber of the host map, such as permissions given at time of purchase of the vehicle which allow the host map to communicate with an ECU of the connected vehicle.

The host mapping system collects data from updates from vehicles using the host mapping system. The host mapping system analyzes the data from the updates to detect "problem spots" or discrepancies where vehicles are not following the map or where there are back-ups or a high levels of accidents. When a discrepancy is found, the host mapping system places a geo-fence around the geographic area of discrepancy, which provides a virtual barrier around the area of interest and can be used to monitor the area. When the virtual barrier is crossed by a connected vehicle, a message may be triggered that may be received by the host mapping system, in the form of an alert. The vehicle provides an alert every time the geo-fence is crossed, thus vehicle volume in the geo-fenced can be determined by dividing the alerts by two.

The host mapping system may set up multiple geo-fences in a geographical region. For example, a primary geo-fence may initially be established around an area of interest. As the area of interest is monitored, the mapping system may identify regions within the area of interest in which the traffic volume is unusually high, vehicles are not following the map, traffic is slower than the speed limit, or the like. The host mapping system may set up secondary geo-fences to monitor the regions, which each may have a different temporal component.

Once the host mapping system has established a geo-fence, the host mapping system may transmit a request to each vehicle subscribed to the host map and entering the geo-fenced area to provide its sensor data to the host mapping system while it is in the geo-fenced area.

The host mapping system creates a geo-fence by specifying the coordinates (latitude and longitude) for a location of interest. To adjust the proximity for the location, a radius is defined. The latitude, longitude, and dimensions, such as a radius, define a geo-fence, creating a circular or polygonal fence around the location of interest.

For each geo-fence, a duration can be established during which the geo-fence is active. The duration of any geo-fence can be set by specifying an expiration duration in milliseconds. After the geo-fence expires, the mapping system automatically removes the geo-fence.

The mapping system may set a notification responsiveness value for each geo-fence. For example, a high notification responsiveness value increases the latency of the geo-fence alerts and improves power consumption. For example, if the responsiveness value is five minutes, the mapping system only checks for an entrance or exit alert once every five minutes.

The temporal component of the geo-fence may be defined by setting activation and expiration times. For example, the geo-fence may be set to activate at 4 PM, expire at 6 PM, and have a notification responsiveness value of one minute. In this example, the duration of the geo-fence is two hours.

The minimum radius of the geo-fence is generally set between 100-150 meters for best results. When Wi-Fi is available, location accuracy is usually between 20-50 meters.

The connected vehicle entering the geo-fenced region may be an autonomous or semi-autonomous vehicle. An autonomous vehicle is a vehicle that is capable of sensing its environment and navigating with little or no user input. A semi-autonomous vehicle is capable of sensing is environment and controlling at least some aspects of navigation, such as controlling braking, cruise control, taking control of the steering during an accident, or the like. Both autonomous and semi-autonomous vehicles sense the environment by using vehicle sensing devices such as radar, LiDAR, image sensors, and the like. Autonomous vehicles further use information from global positioning systems (GPS) technology, navigation systems, vehicle-to-vehicle (V2V) communication, vehicle-to-infrastructure technology (V2I), infrastructure-to-vehicle (V2I/I2V) communication and/or drive-by-wire systems to navigate the vehicle.

Each autonomous or non-autonomous vehicle includes an internal map by which it navigates the roadway. This map may be downloaded from the host mapping system, which is stored remotely from the vehicle. The autonomous or non-autonomous vehicle may update its internal map by connecting to the host mapping system periodically or when in areas of high data connectivity. The owner of the internal map may be subscribed to the host mapping system by permissions granted at time of initial download of the map to the vehicle, or by default, as at time of purchase. As such, the host map has established permissions for updating, receiving alerts and requesting sensor data from the vehicle.

The host map of the present disclosure may be a GPS map, a high definition feature map, a road network map, a drivable surface map, a static obstacle map, or the like as is conventionally known, and is not limited. These maps may be obtained from a third party supplier or be developed from sensor data collected by the (semi-)autonomous cars and/or a combination.

The host mapping system builds upon the host map with details from vehicle map updates and sensor data received from vehicles within a geo-fenced area.

Map information at both the vehicle map and the host map includes road position information (position information by lane), road shape information (curves, types of linear portions, curvatures of the curves, and the like), road width information (lane width information), and vehicle speed limit information regarding roads. The map information also includes position information regarding points of intersection and junctions, position information regarding temporary stop lines, crosswalk position information, and traffic light position information. The map information may also include road gradient information and road cant information.

Autonomous and semi-autonomous vehicles rely on lane level, high definition or "HD maps", that contain much more detail than a GPS map, including the location of trees, curbs and road signs, as well as where the painting lane markers are on the road. High definition maps capture a satellite image of an area and extract map data. "Vision" data from the sensors of a plurality of connected vehicles is combined with the satellite map to generate the high definition map.

An HD map consists of two layers. The first layer contains the fixed objects in a vehicle's environment: highways, intersections, bridges, schools and sidewalks, even minute features like potholes and sewers. On top of that is the semantic layer, which detects all the details that help cars navigate through their environment safely and legally: traffic lights, stop signs, speed limit signs, crosswalks, lane boundaries. This map serves as the vehicle's "memory," and as the vehicle drives, its sensors are also continuously merging it with new live data. The data collected is sent back to the host mapping system to update the virtual world.

The semantic layer of the high definition map lays out every path the vehicle, and other nearby vehicles, can take. The high definition map can be downloaded into the connected vehicle and use the vehicle's existing suite of sensors, such as cameras, LiDAR, radar and others, to collect data about its surroundings. Once the collects the data, the data is sent to the host mapping system where it is transformed into a virtual replica of the landscape.

To safely navigate the road, a vehicle must verify its location against the map at every moment. The analytics process of a high definition map requires speed and accuracy, achieved through AI, deep learning and cloud technology. The vehicle sensor data may be transmitted data back and forth between a vehicle and the host mapping system at 100 times per second. The host mapping system performs the analytics collecting and analyzing information about every facet of its environment. The free-flowing exchange of data allows vehicles to pinpoint their location at any given time, within a few centimeters.

Development of HD maps requires a level of precision that reflects changes in the road in real time. Digital camera images are combined with LiDAR to build detailed 3D maps to represent a real time road network.

One of the issues with this method of creating high definition maps is in keeping the maps updated. An autonomous vehicle using a high definition map for navigation requires it to be up to date at all times. However, simple events like a temporary road closure, a pothole or an accident must be reflected in the host map then pushed out to all of the vehicles that will use it for navigation.

The present disclosure describes a host mapping system which monitors the data fed back to it periodically through updates from vehicles subscribed to the host map. As described above, the host mapping system detects areas where there is a discrepancy between the behavior of these vehicles and the map information. For example, vehicles may travel at a speed lower than the posted speed limit or there may be back-ups at certain times of day. Vehicles may make detours which were not on their travel plans, indicating accidents, road damage, construction, or the like. Vandalism, such as torn down road signs, may cause the vehicle map to have incorrect information, which is detected by the host mapping system at an update. Vehicle interaction at a zipper merge may cause traffic to back up. Map updates are necessary in many situations, for example, vehicles may need to know when traffic ahead is heavy in order to judge the proper time to enter a left or right turn lane.

Upon receiving data from the monitoring, the host mapping system may automatically define a geo-fence around a geographical region in which there is a discrepancy. When a connected vehicle subscribed to the host map enters the geo-fence, the host mapping system may transmit the geo-fence to the connected vehicle and request that the vehicle begin transmitting its sensor data. The geo-fence is pushed to the vehicle when data connectivity allows. For example, a particular geo-fenced area may be in a known dead spot for communication. The host mapping system may therefore request that the vehicle collect data when it gets to the discrepancy region. Similarly, the vehicle may need to cache that data until communication bandwidth improves. Prioritization of the data transmission from the vehicle to the host mapping system may lead to the vehicle storing more data than the vehicle typically would within the geo-fenced area and may require the vehicle collect less data in other areas if the disk space of the vehicle's memory is limited. The host mapping system collects the sensor data as long as the vehicle travels in the geo-fenced area. The host mapping system may push out the geo-fence to a vehicle which enters the geo-fenced area with the request that the vehicle transmit its sensor data until it exits the geo-fenced area. Based on the sensor data received from a plurality of vehicles, the host mapping system updates its map with details of the geo-fenced region. The update may be pushed out to vehicles in the general geographic area of the geo-fence or may be saved and transmitted during a scheduled update.

FIG. 1 illustrates the mapping system environment 100 including geographic map 130 of an area and vehicles travelling on streets of the geographic area. The vehicles may be connected vehicles 140 (e.g., $140_1$, $140_2$, ... ), such as autonomous vehicles or semi-autonomous vehicles. Connected vehicles are those having a circle on the roof representing a sensor platform. Non-connected vehicles 142 ($142_1$, $142_2$, ... ) are also shown travelling on the streets and are shown as those vehicles not having a circle on the roof. The connected vehicles are configured to send and receive data to/from the host mapping system 110. For the sake of clarity, only some of the vehicles are labelled, as needed to describe the environment.

The host mapping system 110 receives updates from the connected vehicles on a map at scheduled times. The host mapping system may also monitor mobile device activity in the map region through location area services. The host mapping system 110 analyzes the updates and mobile device activity for discrepancies between the map data and the update data. For example, the host mapping system may detect that vehicles are travelling faster or slower on a stretch of roadway than expected from historical data, or that traffic backs up in a section of roadway at certain times of day.

In order to monitor the traffic flow on the stretch, the mapping system may set up a first geo-fence 132 to surround the general area of interest. As connected vehicles enter (see $140_1$) and exit (see $140_5$) the first geo-fence 132, alerts are sent to the host mapping system at a first notification responsiveness value. The host mapping system counts the number of connected vehicles which pass through the first geo-fence 132 and compares this number to an expected number from historical records. If the host mapping system determines that there is a discrepancy in the traffic flow, the host mapping system requests that connected vehicles 140 having a subscription agreement with the host map transmit their sensor data at a first data rate during the time they are within the first geo-fenced area. The host mapping system may determine that traffic within an area of the geo-fence appears to be highly dense or that vehicles are leaving the roadway lanes based on the sensor data. The host mapping system may set up a second geo-fence 134 around this area having a second notification responsiveness value which is less than the first notification responsiveness value. The host mapping system 110 requests that connected vehicles 140 having a subscription agreement with the host map and entering (i.e., $140_2$, $140_6$) the second geo-fence 134 transmit their sensor data at a second data rate during the time they are within the second geo-fenced area. For example, vehicles $140_2$, $140_3$, $140_4$ and $140_6$ may be requested to transmit their sensor data at the second data rate and end the transmission at the first data rate. The second data rate may be larger than the first data rate, in order to provide real-time responsiveness. The host mapping system may set up multiple geo-fences in an area of a detected discrepancy having different or the same notification responsiveness rates. The geo-fences are not required to be nested.

In FIG. 1, the first and second sensor data are used by the mapping system to determine the cause of the discrepancy. For example, the back-up on the street travelled by vehicle $142_1$ and autonomous vehicle $140_1$ is identified as caused by an obstruction 152. From the received sensor data, the host mapping system can determine whether the obstruction is a pothole, accident, stopped vehicle or the like by matching the obstruction data to a database of stored discrepancy data. The host mapping system may use the sensor data to generate 3-D images of the obstruction, which are matched against a database of known 3-D images. The host mapping system may then push out an update to the internal maps of the subscribed vehicles in the geo-fenced region and/or in surrounding areas. The vehicles may show the obstruction on their map display and/or may reroute the vehicle around the area of the back-up.

In general, vehicle maps are only updated on a sparse update schedule, which may range from one month to three years. However, autonomous and semi-autonomous vehicles must have accurate internal maps in order to navigate effectively, therefore it may be necessary to push out an update more often or even in real-time when a discrepancy is found.

A geo-fence may be activated during certain time periods or on certain days. For example, if the host mapping system receives a high level of updates which show that traffic typically backs up during rush hours on a section of roadway, the geo-fence may be set up to be active during the hours of 4-6 PM on weekdays. From the sensor data collected, the mapping system may determine that traffic should be re-routed around this area of roadway.

The host map may be synchronized with observation of discrepancies in the roadway and the observation of other vehicles. A confidence interval could be generated as more and more other vehicles deviate from their internal maps as they travel in the geo-fenced region. A confidence level is the specific percentage which is deemed correct.

In another example, the mapping system may receive a high level of updates which indicate that vehicles are leaving the planned route and detouring around it in a geographical region during morning rush hour. A geo-fence may be scheduled to be active from 7-10 AM on weekdays. Sensor data collected during these hours may be analyzed and it may be determined that the roadway is being rerouted during rush hour. A geo-fence may be temporary, such as shown in FIG. 1 where a temporary obstruction 152 is in the roadway, or may be semi-permanent, such as for monitoring a road during certain hours to detect typographic changes. In a further scheduling example, a geo-fence may be activated during winter months around areas which typically have dangerous icy conditions, such as bridges, to detect whether traffic can safely be routed to travel in the area or must be rerouted.

In an aspect of the present disclosure, a geo-fence or a plurality of geo-fences may be activated and deactivated based on a time of day. For example, the host mapping system may determine that traffic backs up on a section of roadway at a particular time of day and may activate a geo-fence during this time period for a monitoring period.

Figure 2A:
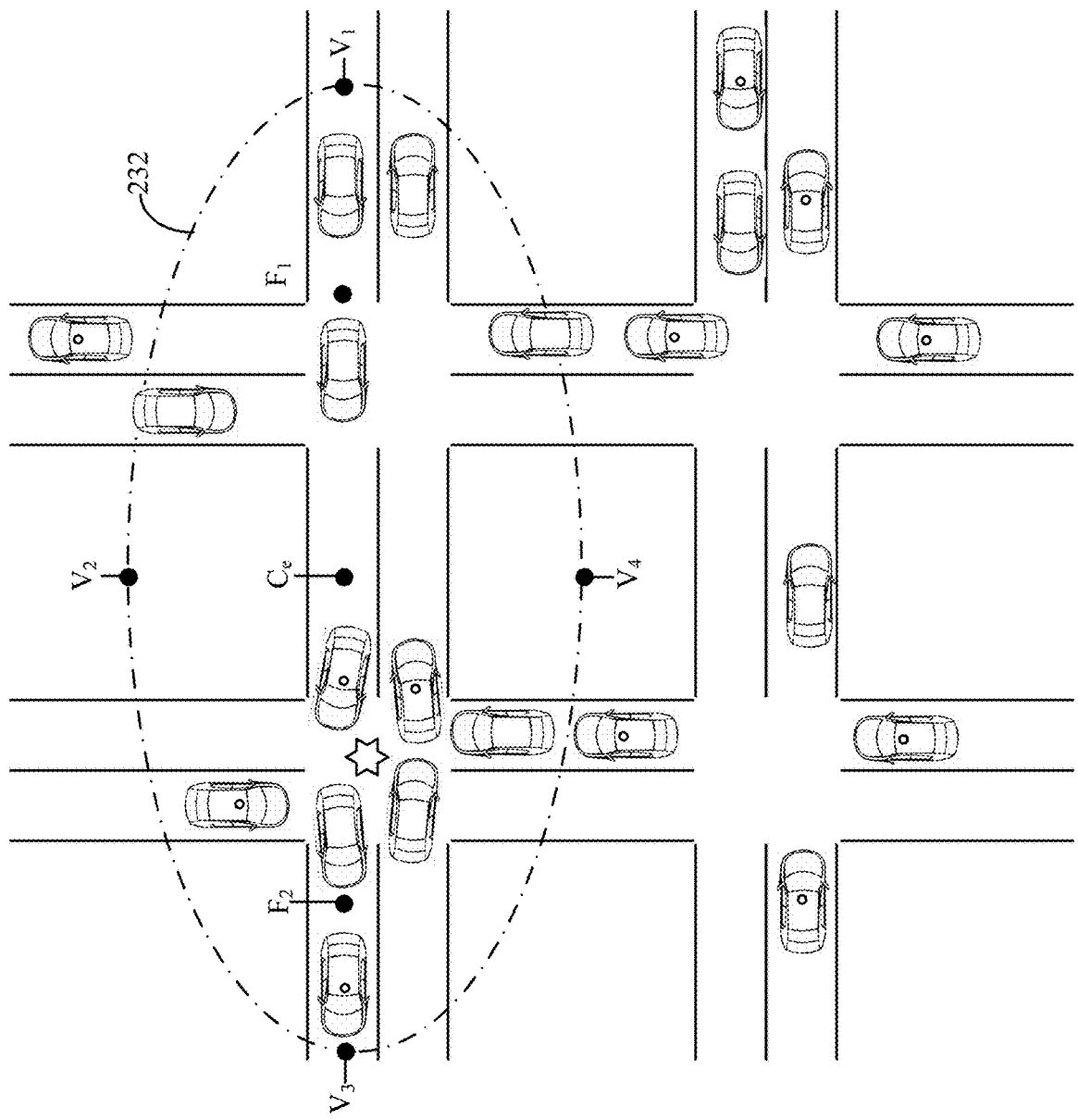
FIG. 2A illustrates an elliptical geo-fence, according to certain embodiments.
Figure 2B:
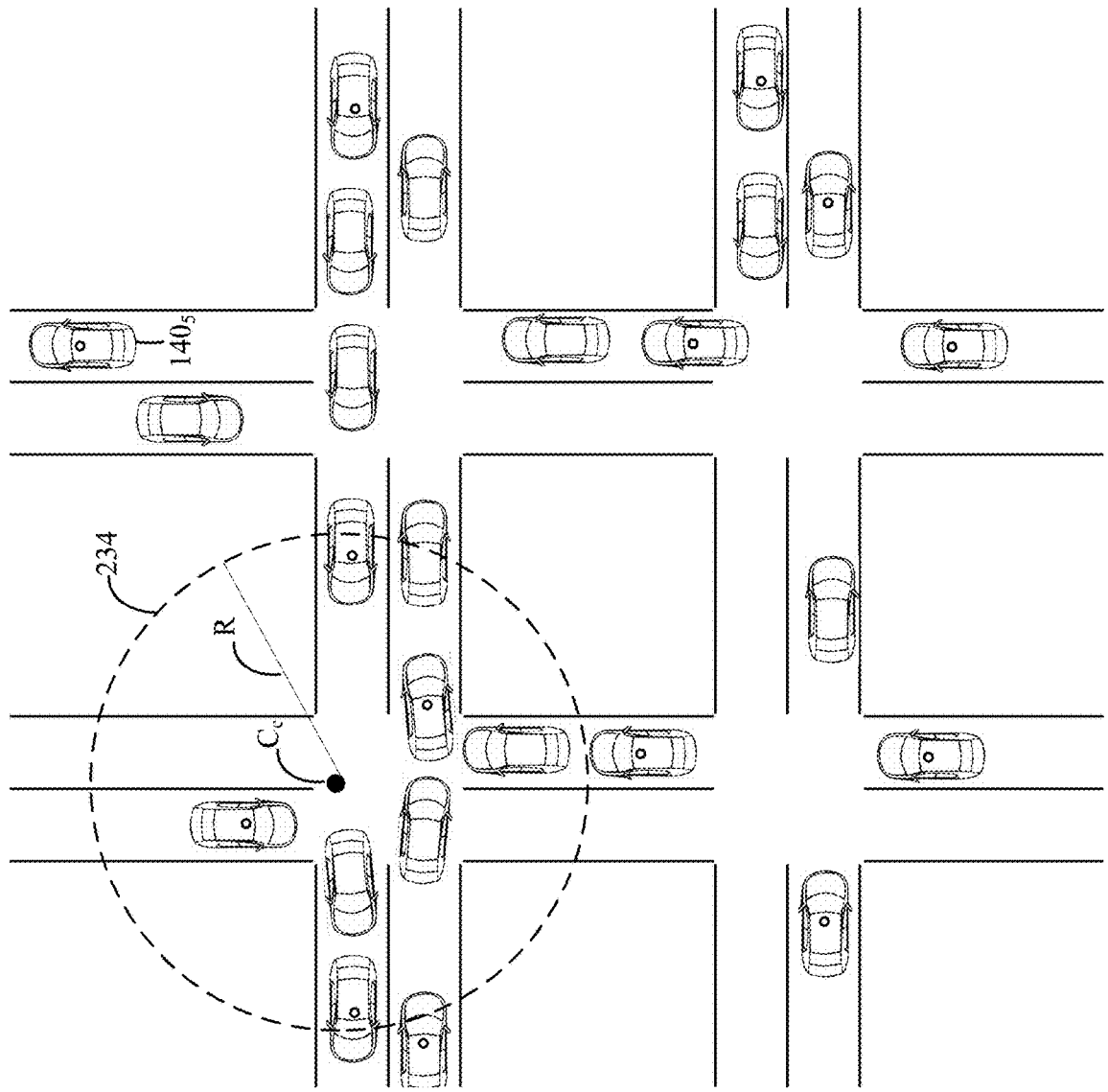
FIG. 2B illustrates a circular geo-fence, according to certain embodiments.
Figure 2C:
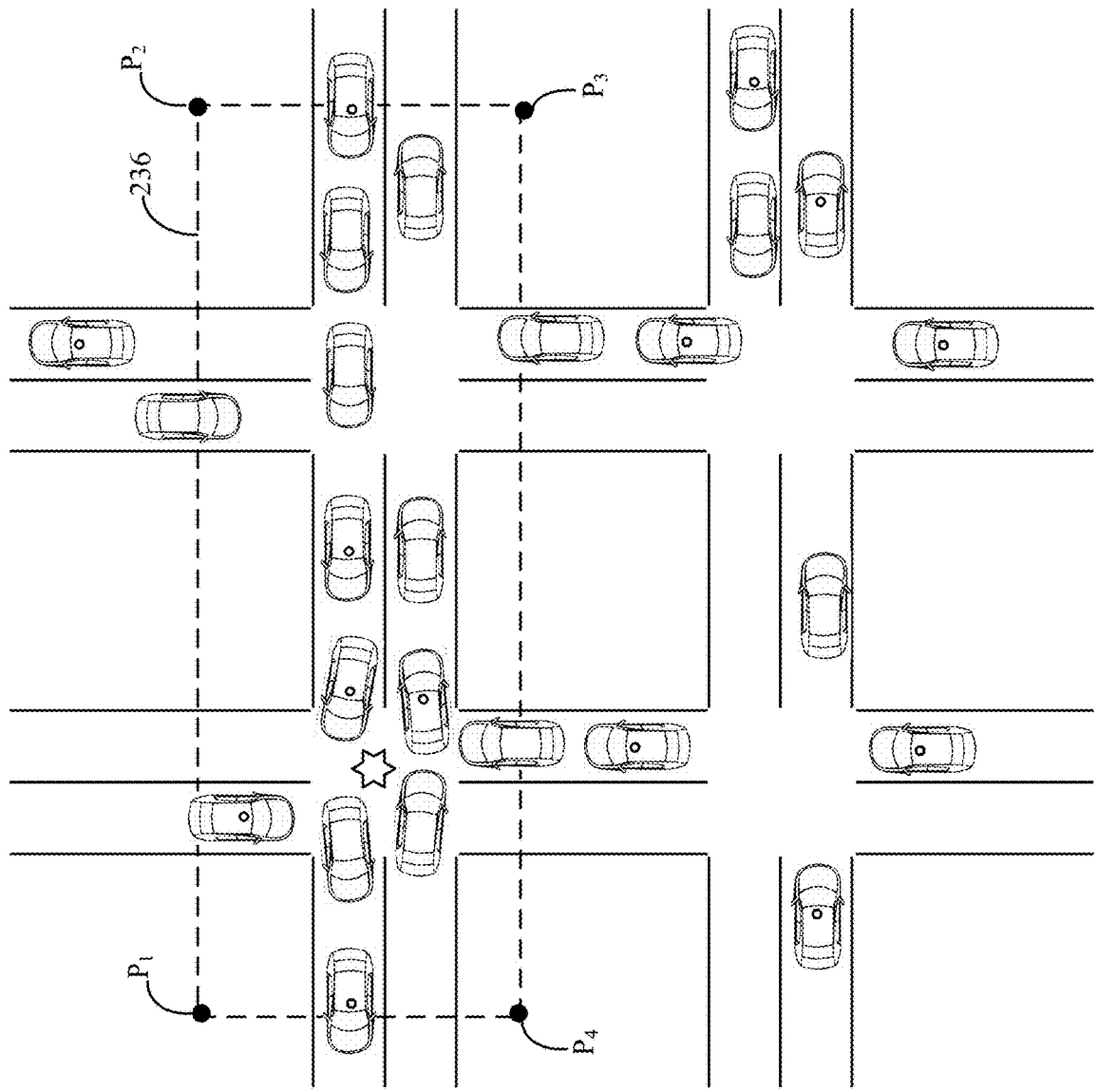
FIG. 2C illustrates rectangular geo-fence, according to certain embodiments.
Figure 2D:
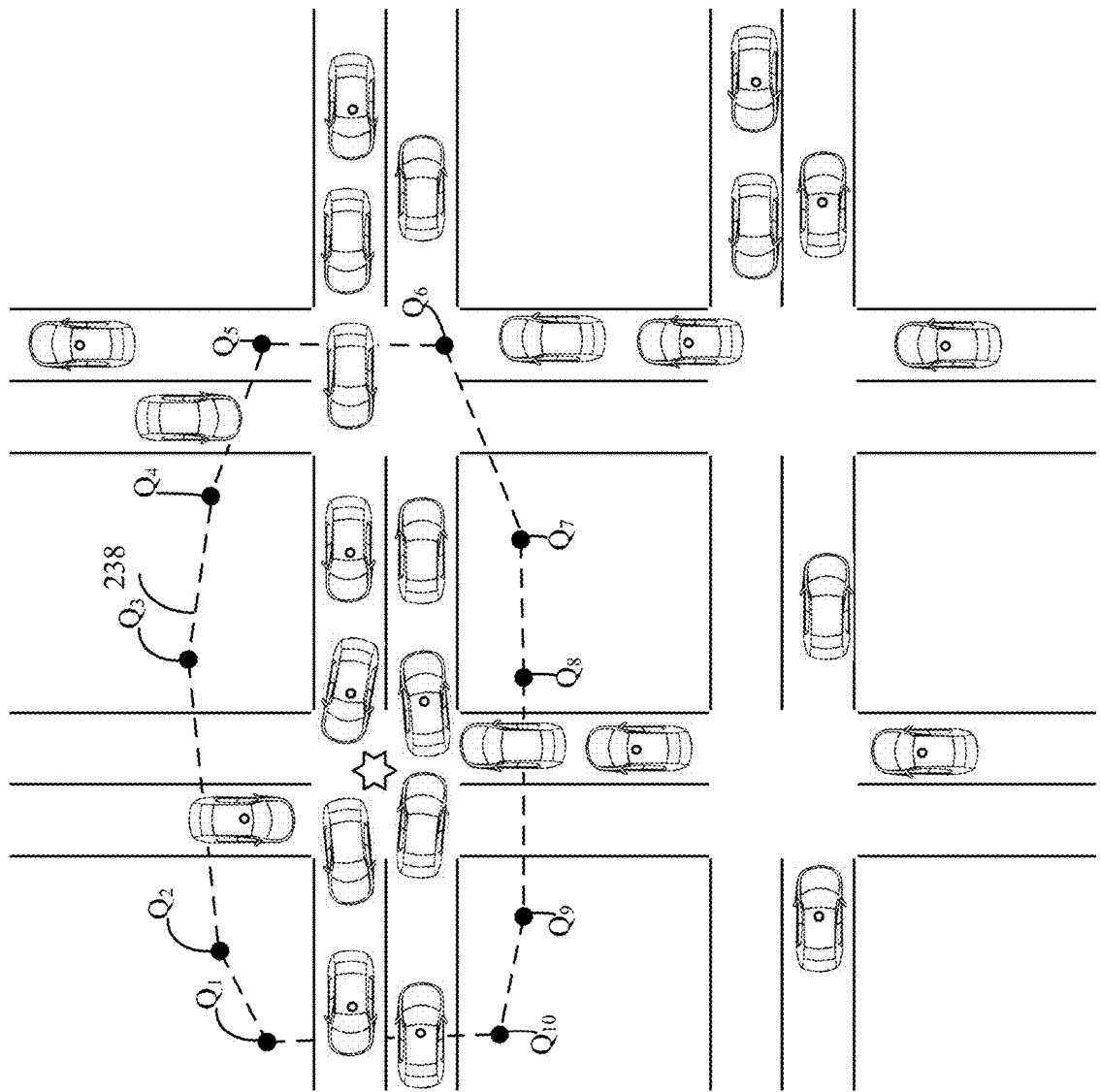
FIG. 2D illustrates a polygonal geo-fence, according to certain embodiments.

An elliptical geo-fence 232 as shown in FIG. 2B, may be defined by a coordinates which define a center point $C_e$, focal points $F_1$ and $F_2$, a vertex $V_1$, and a co-vertex $V_2$, a time of day, a duration, a notification responsiveness value, a start date, an end date and a repetition value. The duration defines the active period of the geo-fence. At the end of the duration, the geo-fence expires. The repetition value determines how often the geo-fence is activated. Alternatively, the elliptical geo-fence 232 may be defined by a two coordinates, $V_1$ and $V_3$, which define the boundaries of its major axis and two coordinates, $V_2$ and $V_4$, which define the boundaries of its minor axis, a time of day, a duration, a notification responsiveness value, a start date, an end date and a repetition value. A circular geo-fence, such as geo-fence 234 shown in FIG. 2B, may be defined by a central coordinate, $C_c$, a radius, R, a time of day, a duration, a notification responsiveness value, a start date, an end date and a repetition value. A rectangular geo-fence, such as geo-fence 236 shown in FIG. 2C, may be defined by a four corner coordinates ($P_1$, $P_2$, $P_3$, $P_4$), a time of day, a duration, a notification responsiveness value, a start date, an end date and a repetition value. A polygonal geo-fence, such as geo-fence 238 shown in FIG. 2D, may be defined by a set of coordinates ($Q_1$-$Q_{10}$) connected by straight lines in a "connect the dots" manner, a time of day, a duration, a notification responsiveness value, a start date, an end date and a repetition value.

Table 1 shows examples of geo-fence parameters which may be used in FIG. 2A-2D. Table 1 is exemplary only and does not limit the geo-fence parameters. The parameters of the geo-fence are set by the host mapping system and are determined based on analysis of successive current and historical map updates received from a plurality of connected vehicles. The time of day may be expressed in 24 hour clock format.

TABLE 1

Examples of Geo-Fence Parameters

| Geo-fence | Coordinates | Time of Day (hr, min) | Duration (hr, min) | Notification Responsiveness Value (min) | Start Date | End Date | Repetition Value |
|---|---|---|---|---|---|---|---|
| 232 | $C_e$, $F_1$, $F_2$, $V_1$, $V_2$ | 0600 | 4, 0 | 5 | May 1, 2020 | Aug. 1, 2020 | 1 |
| 232 (alt) | $V_1$, $V_2$, $V_3$, $V_4$ | 1600 | 2, 0 | 5 | May 1, 2020 | Aug. 1, 2020 | 1 |
| 234 | $C_c$, R | 1200 | 1, 15 | 1 | May 1, 2020 | May 1, 2020 | 1 |
| 234 | $C_c$, R | 0700 | 3, 0 | 2 | May 1, 2020 | May 8, 2020 | 4 |
| 236 | $P_1$, $P_2$, $P_3$, $P_4$ | 1700 | 3, 0 | 10 | May 1, 2020 | May 8, 2020 | 2 |
| 238 | $Q_1$-$Q_{10}$ | 1045 | 0, 15 | 1 | May 1, 2020 | May 1, 2020 | 1 |

Figure 3:
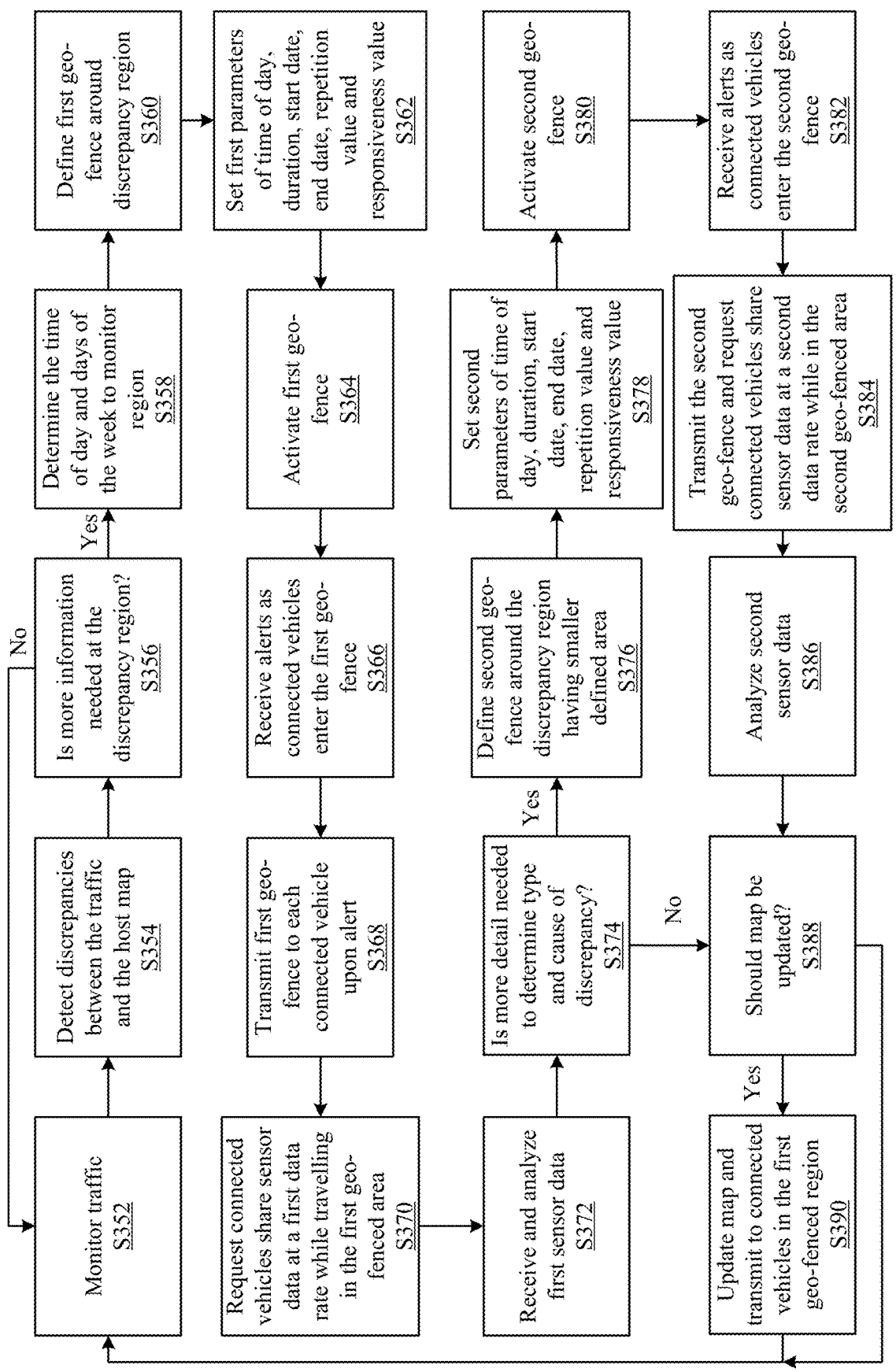
FIG. 3 is an exemplary flowchart of the map updating process, according to certain embodiments.

FIG. 3 is a flow chart of the process used by the host mapping system to gather data from connected vehicles to update its map.

At step S352, the host mapping system monitors traffic flow. Traffic monitoring can include comparison of satellite images, analysis of vehicle map updates, monitoring of mobile device signals, or the like. The host mapping system periodically receives map data updates from connected vehicles subscribed to the host map, which report areas in which a vehicle map does not match the host map. Additionally, mobile devices in an area can be tracked by location services, and data such as velocity of the mobile device can be determined. Connection of a mobile device with a base station and handover to another base station can determine the velocity of the mobile device. The mobile devices monitored may be handheld smart phones and onboard communication systems of connected vehicles. The monitoring detects map areas in which traffic does not flow at an expected rate. For example, traffic may back up, slow down or be faster than the set speed limit for an area. In another example, traffic flow at a stop sign or traffic light may not be consistent with the map, indicating that the stop sign has been damaged, the traffic light is not working properly, or the like. In a further example, an accident or popular event may back up traffic. Additionally, the host mapping system may receive reroute requests from vehicles leaving their planned routes because of a detour, road construction, accident, or other road problem. At step S354, the host monitoring system determines any discrepancies in the expected movement of the traffic, and at step S356 determines whether additional information is needed to pinpoint the cause and type of the discrepancy so as to update the host map accordingly. If no more information is needed, the process returns to monitoring traffic at S352. If more information is needed, the process moves to step S358, where the host mapping system determines the best time of day and days of the week to monitor the region(s) in which the discrepancies are found. At step S360, a first geo-fence is defined to be placed around the discrepancy region. Defining the geo-fence includes determining the geo-graphical coordinates needed to determine a shape, such as a radius and center point for a circle, vertices for a rectangular geo-fence or a set of coordinates for a polygonal geo-fence as described above.

At step 362, first parameters of time of day, duration, start date, end date, repetition value and notification responsiveness value are set for the first geo-fence. At step 364, the first geo-fence is activated on the start date at the specified time of day. At step 366, the host mapping system receives alerts as connected vehicles enter the first geo-fence. At step 368, the host mapping system transmits the first geo-fence to each connected vehicle upon receiving each alert and, at step 370, requests that the connected vehicles share sensor data with the host mapping system at a first data rate while travelling in the first geo-fenced area. At step 372, the host mapping system may aggregate a plurality of first sensor data from independent vehicles and analyze the first sensor data for data regarding the discrepancy. For example, camera images may show an accident, a pothole, construction, etc. in the region of the discrepancy, and that surrounding vehicles are leaving the roadway to go around the discrepancy. LiDAR and radar may detect the proximity and speed of surrounding vehicles. At step S374, the host mapping system decides whether more data is needed to determine the type and cause of the discrepancy. The decision may include calculating a confidence level from matching the discrepancy data with database records for known discrepancies. If no more data is needed, the host mapping system decides whether the host map should be updated at step S388. If NO, then the process returns to step S352. If YES, then the host mapping system updates the host map and transmits an update to the connected vehicles in the first geo-fenced region at step S390.

At step S374, if the host mapping system decides that more detail is needed, a second geo-fence can be defined around the discrepancy region at step S376. The second geo-fence may have a smaller defined area than the first geo-fenced area, for example, a smaller radius, and may be more closely centered around the discrepancy based on the analysis of the first sensor data. At step S378, second parameters of time of day, duration, start date, end date, repetition value and responsiveness value are set for the second geo-fence. The second parameters may differ from the first parameters. For example, the second parameters may have a time of day which is later than the time of day of the first parameters, and may have a shorter duration and smaller responsiveness value. At step S380, the second geo-fence is activated based on the time of day and start date. At step S382, the host mapping system receives alerts as connected vehicles enter the second geo-fence region. At step S384, the host mapping system transmits the second geo-fence to each connected vehicle upon receiving each alert and requests that the connected vehicles share sensor data with the host mapping system at a second data rate while travelling in the second geo-fenced area. The second data rate may be higher than the first data rate in order that the host mapping system receives the sensor data at closer to real time.

At step S386, a processor of the host mapping system analyzes the second sensor data. At step S388, a decision is made as to whether the host map should be updated. If not, the process returns to step S352 to monitor traffic. If YES, the host map is updated and transmitted to connected vehicles in the first geo-fenced area, after which the process returns to monitor traffic at step S352.

Figure 4:
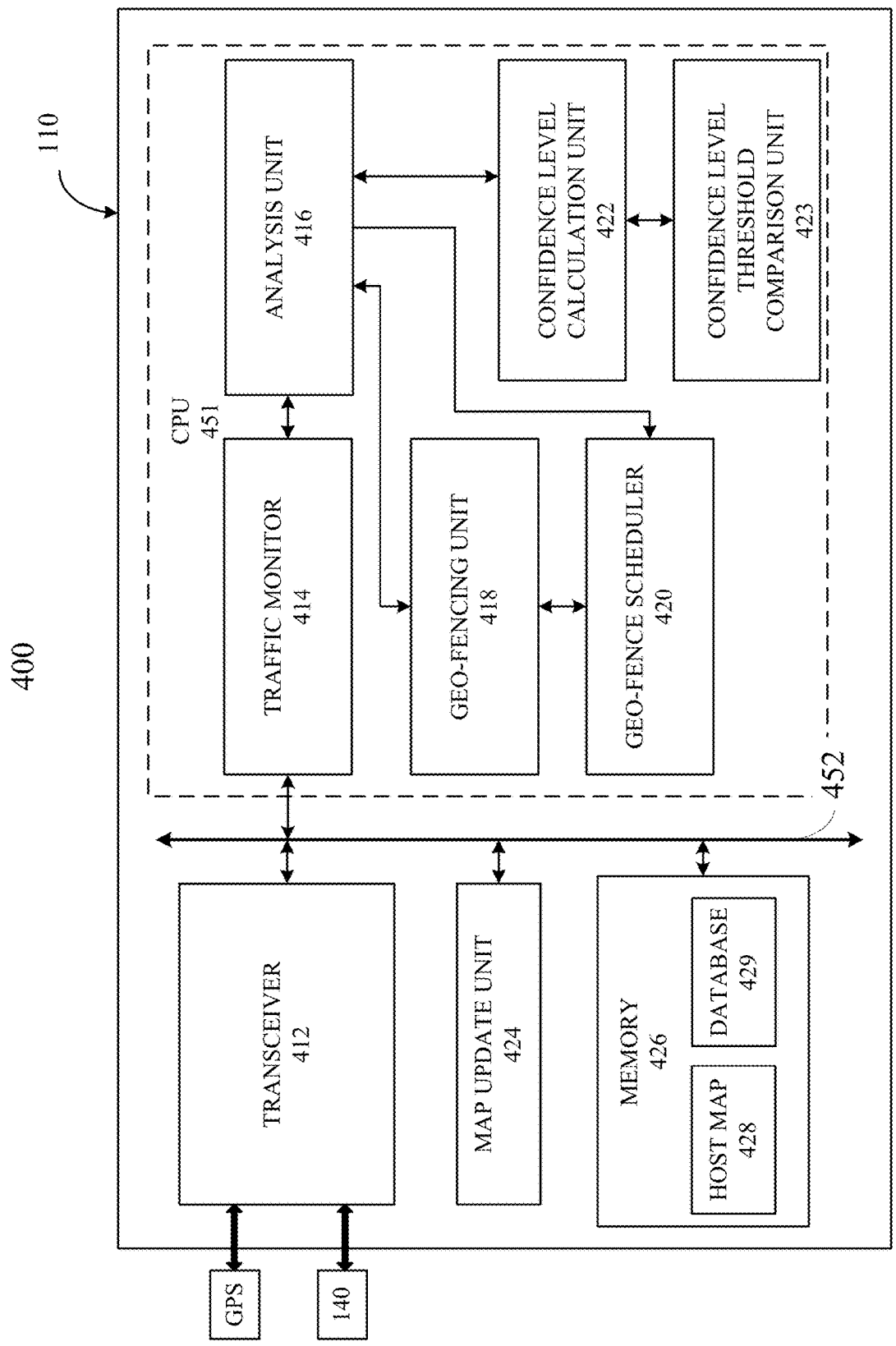
FIG. 4 is an exemplary illustration of the host mapping system, according to certain embodiments.

FIG. 4 illustrates aspects of the host mapping system 110. Transceiver 412 is configured to receive GPS satellite data, updates and sensor data from connected vehicles 140 and optionally, data from mobile devices operating in the map area. CPU 451 includes traffic monitor 414 which is operatively connected to analysis unit 416. The analysis unit is operatively connected to geo-fence unit 418 and geo-fence scheduler 420. A confidence level calculation unit 422 is bi-directionally connected to the analysis unit. A map update unit 424, memory including host map 428 and database 429 are operatively connected to the CPU through bus 452.

The first embodiment is illustrated with respect to FIG. 1-8. The first embodiment describes a host mapping system 110 configured to update a region 130 of a host map 428 based on sensor data received from a plurality of connected vehicles 140 (e.g., $140_1$, $140_2$, . . . ) travelling in the region, comprising a transceiver 412 configured to receive location area signals from the plurality of connected vehicles travelling in the region, a computing processing unit (CPU) including processing circuitry configured to execute program instructions stored on a computer-readable medium causing the processing circuitry to: monitor vehicle traffic activity in the region based on the location area signals, determine (step S354) whether a discrepancy (e.g. 152) exists between the vehicle traffic activity and expected vehicle traffic activity based on the host map, when no discrepancy exists, continue monitoring vehicle traffic activity, when a discrepancy exists, determine a map area of the discrepancy and determine a first schedule (see 420, S358) for requesting first sensor data from the plurality of connected vehicles, surround the map area of the discrepancy with a first geo-fence 132 (S360), wherein the first geo-fence is configured to activate (S364) based on the first schedule, receive (S366) an alert when a connected vehicle enters the first geo-fence, transmit (S368) the first geo-fence to the connected vehicle, request (S370) that the connected vehicle transmit the first sensor data while travelling in the map area of the first geo-fence, receive S372 (by transceiver 412) the first sensor data from each connected vehicle travelling in the map area of the first geo-fence, compare (by analysis unit 416) the first sensor data to the first geo-fenced area of the map, identify the discrepancy, update the host map (see map updater 424), and transmit S390 the update to the plurality of connected vehicles travelling in the map region.

The host mapping system further comprises wherein the processing circuitry is configured to monitor (see traffic monitor 414, step 352) a volume of the vehicle traffic to determine at least one time of day in which the volume is greater than a first traffic volume threshold, wherein the processing circuitry is configured to monitor the volume of the vehicle traffic to determine (S358) at least one day of the week in which the volume is greater than a second traffic volume threshold, and wherein the processing circuitry is configured to determine the first schedule based on the at least one time of day in which the volume is greater than the first traffic volume threshold and the at least one day of the week in which the volume is greater than the second traffic volume threshold.

The host mapping system is further configured to determine a confidence level based on matching the discrepancy to a database 429 of known discrepancies, compare the confidence level to a confidence level threshold, drop the update if the confidence level is below the confidence level threshold and update the host map when the confidence level is equal to or greater than the confidence level threshold.

The host mapping system processing circuitry is further configured to receive an alert when a connected vehicle enters the first geo-fence, wherein the transceiver is configured to transmit the first geo-fence to the connected vehicle when the alert is received.

The processing circuitry is further configured to aggregate the first sensor data from the plurality of connected vehicles, convert the first sensor data to map data to generate additional map data, compare the additional map data to historical map data (stored in database 429), and update the host map by adding the additional map data to the historical map data when the confidence level is equal to or greater than the confidence level threshold.

The processing circuitry of the host mapping system is further configured to generate a set of geographical coordinates and a set of first geo-fence parameters to the geofencing unit, wherein the first geo-fence parameters include the first schedule and a first notification responsiveness value, wherein the first schedule includes a time of day, a duration, a start date, an end date and a repetition value and the first notification responsiveness value defines a time period at which the transceiver receives the alerts.

The processing circuitry of the host mapping system is configured to (S376) surround the map area of the discrepancy with a second geo-fence 134, wherein the second geo-fence is smaller than the first geo-fence, determine (S378) a second schedule for the second geo-fence, where the second schedule is a subset of the first schedule, determine a second notification responsiveness value for the second geo-fence, wherein the second notification responsiveness value is less than or equal to the first notification responsiveness value, receive an alert (S382) when a connected vehicle enters the second geo-fence, transmit (S384) the second geo-fence to the connected vehicle, request that the connected vehicle transmit second sensor data while travelling in the map area of the second geo-fence, receive the second sensor data from each connected vehicle travelling in the map area of the second geo-fence, compare the second sensor data to the second geo-fenced area of the map, identify the discrepancy, update the host map, and transmit (S390) the update to the plurality of connected vehicles travelling in the map region.

The processing circuitry of the host mapping system is configured to request that the connected vehicle transmit sensor data at a first data rate while travelling in the map area of the first geo-fence, and request that the connected vehicle transmit sensor data at a second data rate while travelling in the map area of the second geo-fence, wherein the second data rate is greater than the first data rate.

The processing circuitry of the host mapping system is configured to request that the connected vehicle to transmit first or second sensor data when in travelling in areas in which data connectivity is high and cache first or second sensor data when travelling in areas in which data connectivity is low.

The second embodiment is illustrated with respect to FIG. 1-8. The second embodiment describes a method for updating a region of a host map 130 based on sensor data received from a plurality of connected vehicles 140 (e.g., 140$_1$, 140$_2$, . . . ) travelling in the region, comprising receiving location area signals from the plurality of connected vehicles travelling in the region, monitoring (S352), with processing circuitry (CPU 451), vehicle traffic activity in the region based on the location area signals, determining (S354) whether a discrepancy exists between the vehicle traffic activity and expected vehicle traffic activity based on the host map, continuing to monitor vehicle traffic activity when no discrepancy exists, determining (S360) a map area of the discrepancy and determining (S358) a first schedule (S362) for requesting first sensor data from the plurality of connected vehicles when a discrepancy exists, surrounding the map area of the discrepancy with a first geo-fence, wherein the first geo-fence is configured to activate (S364) based on the first schedule, receiving an alert (S366) when a connected vehicle enters the first geo-fence, transmitting (S368) the first geo-fence to the connected vehicle, requesting (S370) that the connected vehicle transmit first sensor data while travelling in the map area of the first geo-fence, receiving the first sensor data from each connected vehicle travelling in the map area of the first geo-fence, comparing the first sensor data to the first geo-fenced area of the map, identifying the discrepancy (S372, S374), updating the host map (S390), and transmitting the update to the plurality of connected vehicles travelling in the map region.

The method includes monitoring, with the processing circuitry, a volume of the vehicle traffic to determine at least one time of day in which the volume is greater than a first traffic volume threshold, monitoring, with the processing circuitry, the volume of the vehicle traffic to determine at least one day of the week in which the volume is greater than a second traffic volume threshold, and determining the first schedule based on the at least one time of day in which the volume is greater than the first traffic volume threshold and the at least one day of the week in which the volume is greater than the second traffic volume threshold.

The method includes aggregating, with the processing circuitry, the first sensor data from the plurality of connected vehicles, converting the first sensor data to map data to generate additional map data, comparing the additional map data to historical map data, determining a confidence level based on matching the discrepancy to a database of known discrepancies, comparing the confidence level to a confidence level threshold, dropping the update if the confidence level is below the confidence level threshold and updating the host map when the confidence level is equal to or greater than the confidence level threshold.

The method further includes surrounding the map area of the discrepancy with a second geo-fence, wherein the second geo-fence is smaller than the first geo-fence, determining, with the processing circuitry, a second schedule for the second geo-fence, where the second schedule is a subset of the first schedule, determining a second notification responsiveness value for the second geo-fence, wherein the second notification responsiveness value is less than or equal to the first notification responsiveness value, receiving an alert when a connected vehicle enters the second geo-fence, transmitting the second geo-fence to the connected vehicle, requesting that the connected vehicle transmit second sensor data while travelling in the map area of the second geo-fence, receiving the second sensor data from each connected vehicle travelling in the map area of the second geo-fence, comparing the second sensor data to the second geo-fenced area of the map, identifying the discrepancy, updating the host map, and transmitting the update to the plurality of connected vehicles travelling in the map region.

The method further includes requesting that the connected vehicle transmit sensor data at a first data rate while travelling in the map area of the first geo-fence, and requesting that the connected vehicle transmit sensor data at a second data rate while travelling in the map area of the second geo-fence, wherein the second data rate is greater than the first data rate.

The method includes requesting that the connected vehicle transmit the first or second sensor data when travelling in areas in which data connectivity is high and cache first or second sensor data when travelling in areas in which data connectivity is low.

The third embodiment is illustrated with respect to FIG. 1-8. The third embodiment describes a non-transitory computer readable medium having instructions stored therein that, when executed by one or more processors, cause the one or more processors to perform a method for updating a region of a host map 130 based on sensor data received from a plurality of connected vehicles 140 (e.g., $140_1$, $140_2$, . . . ) travelling in the region, comprising receiving location area signals from the plurality of connected vehicles travelling in the region, monitoring (S352), with processing circuitry (CPU 451), vehicle traffic activity in the region based on the location area signals, determining (S354) whether a discrepancy exists between the vehicle traffic activity and expected vehicle traffic activity based on the host map, continuing to monitor vehicle traffic activity when no discrepancy exists, determining (S360) a map area of the discrepancy and determining (S358) a first schedule (S362) for requesting first sensor data from the plurality of connected vehicles when a discrepancy exists, surrounding the map area of the discrepancy with a first geo-fence, wherein the first geo-fence is configured to activate (S364) based on the first schedule, receiving an alert (S366) when a connected vehicle enters the first geo-fence, transmitting (S368) the first geo-fence to the connected vehicle, requesting (S370) that the connected vehicle transmit first sensor data while travelling in the map area of the first geo-fence, receiving the first sensor data from each connected vehicle travelling in the map area of the first geo-fence, comparing the first sensor data to the first geo-fenced area of the map, identifying the discrepancy (S372, S374), updating the host map (S390), and transmitting the update to the plurality of connected vehicles travelling in the map region.

The non-transitory computer readable medium method includes monitoring, with the processing circuitry, a volume of the vehicle traffic to determine at least one time of day in which the volume is greater than a first traffic volume threshold, monitoring, with the processing circuitry, the volume of the vehicle traffic to determine at least one day of the week in which the volume is greater than a second traffic volume threshold, and determining the first schedule based on the at least one time of day in which the volume is greater than the first traffic volume threshold and the at least one day of the week in which the volume is greater than the second traffic volume threshold.

The non-transitory computer readable medium method includes aggregating, with the processing circuitry, the first sensor data from the plurality of connected vehicles, converting the first sensor data to map data to generate additional map data, comparing the additional map data to historical map data, determining a confidence level based on matching the discrepancy to a database of known discrepancies, comparing the confidence level to a confidence level threshold, dropping the update if the confidence level is below the confidence level threshold and updating the host map when the confidence level is equal to or greater than the confidence level threshold.

The non-transitory computer readable medium method further includes surrounding the map area of the discrepancy with a second geo-fence, wherein the second geo-fence is smaller than the first geo-fence, determining, with the processing circuitry, a second schedule for the second geo-fence, where the second schedule is a subset of the first schedule, determining a second notification responsiveness value for the second geo-fence, wherein the second notification responsiveness value is less than or equal to the first notification responsiveness value, receiving an alert when a connected vehicle enters the second geo-fence, transmitting the second geo-fence to the connected vehicle, requesting that the connected vehicle transmit second sensor data while travelling in the map area of the second geo-fence, receiving the second sensor data from each connected vehicle travelling in the map area of the second geo-fence, comparing the second sensor data to the second geo-fenced area of the map, identifying the discrepancy, updating the host map, and transmitting the update to the plurality of connected vehicles travelling in the map region.

Figure 5:
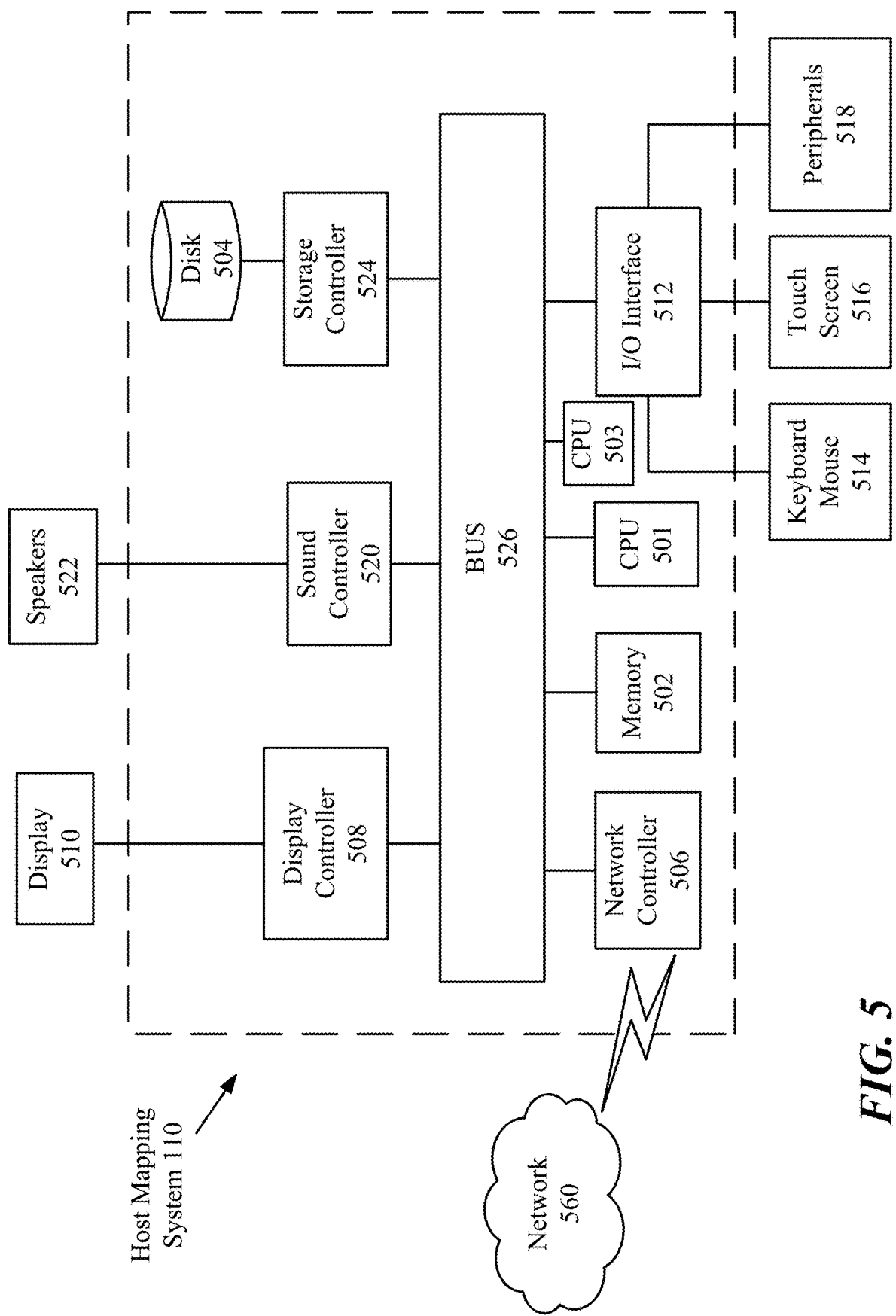
FIG. 5 is an illustration of a non-limiting example of details of computing hardware used in the computing device, according to certain embodiments.

Next, further details of the hardware description of the computing environment of FIG. 4, according to exemplary embodiments, is described with reference to FIG. 5. In FIG. 5, a controller 500 is described is representative of the system 400 of FIG. 4 in which the controller is a computing device which includes a CPU 501 which performs the processes described above/below. The process data and instructions may be stored in memory 502. These processes and instructions may also be stored on a storage medium disk 504 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 501, 503 and an operating system such as Microsoft Windows 7, UNIX, Solaris, LINUX, Apple MAC-OS and other systems known to those skilled in the art.

The hardware elements in order to achieve the computing device may be realized by various circuitry elements, known to those skilled in the art. For example, CPU 501 or CPU 503 may be a Xenon or Core processor from Intel of America or an Opteron processor from AMD of America, or may be other processor types that would be recognized by one of ordinary skill in the art. Alternatively, the CPU 501, 503 may be implemented on an FPGA, ASIC, PLD or using discrete logic circuits, as one of ordinary skill in the art would recognize. Further, CPU 501, 503 may be implemented as multiple processors cooperatively working in parallel to perform the instructions of the inventive processes described above.

The computing device in FIG. 5 also includes a network controller 506, such as an Intel Ethernet PRO network interface card from Intel Corporation of America, for interfacing with network 560. As can be appreciated, the network 560 can be a public network, such as the Internet, or a private network such as an LAN or WAN network, or any combination thereof and can also include PSTN or ISDN sub-networks. The network 560 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 508, such as a NVIDIA GeForce GTX or Quadro graphics adaptor from NVIDIA Corporation of America for interfacing with display 510, such as a Hewlett Packard HPL2445w LCD monitor. A general purpose I/O interface 512 interfaces with a keyboard and/or mouse 514 as well as a touch screen panel 516 on or separate from display 510. General purpose I/O interface also connects to a variety of peripherals 518 including printers and scanners, such as an OfficeJet or DeskJet from Hewlett Packard.

A sound controller 520 is also provided in the computing device such as Sound Blaster X-Fi Titanium from Creative, to interface with speakers/microphone 522 thereby providing sounds and/or music.

The general purpose storage controller 524 connects the storage medium disk 504 with communication bus 526, which may be an ISA, EISA, VESA, PCI, or similar, for interconnecting all of the components of the computing device. A description of the general features and functionality of the display 510, keyboard and/or mouse 514, as well as the display controller 508, storage controller 524, network controller 506, sound controller 520, and general purpose I/O interface 512 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 6.

Figure 6:
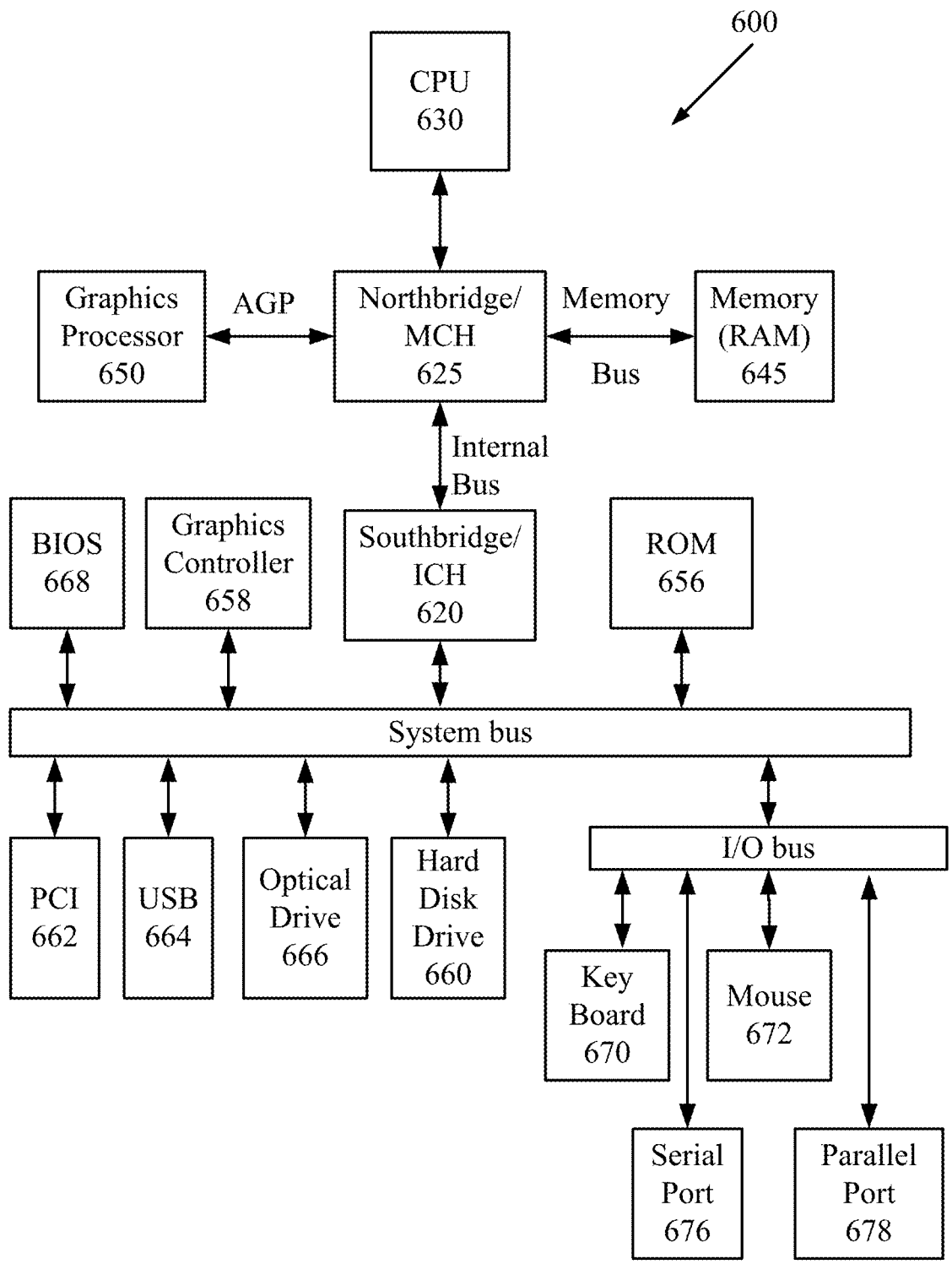
FIG. 6 is an exemplary schematic diagram of a data processing system used within the computing device, according to certain embodiments.

FIG. 6 shows a schematic diagram of a data processing system, according to certain embodiments, for performing the functions of the exemplary embodiments. The data processing system is an example of a computer in which code or instructions implementing the processes of the illustrative embodiments may be located.

In FIG. 6, data processing system 600 employs a hub architecture including a north bridge and memory controller hub (NB/MCH) 625 and a south bridge and input/output (I/O) controller hub (SB/ICH) 620. The central processing unit (CPU) 630 is connected to NB/MCH 625. The NB/MCH 625 also connects to the memory 645 via a memory bus, and connects to the graphics processor 650 via an accelerated graphics port (AGP). The NB/MCH 625 also connects to the SB/ICH 620 via an internal bus (e.g., a unified media interface or a direct media interface). The CPU Processing unit 630 may contain one or more processors and even may be implemented using one or more heterogeneous processor systems.

Figure 7:
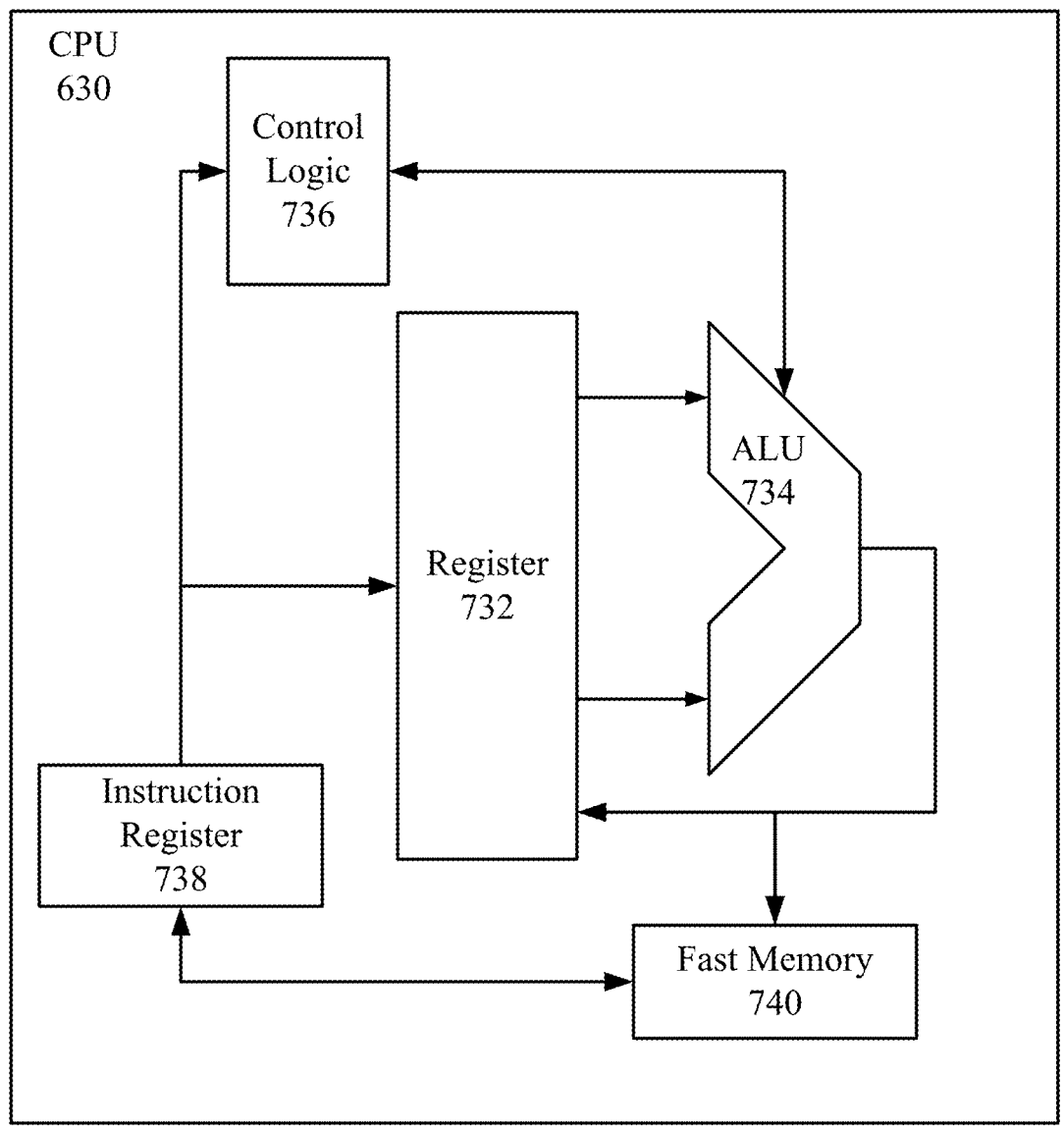
FIG. 7 is an exemplary schematic diagram of a processor used with the computing device, according to certain embodiments.

For example, FIG. 7 shows one implementation of CPU 630. In one implementation, the instruction register 738 retrieves instructions from the fast memory 740. At least part of these instructions are fetched from the instruction register 738 by the control logic 736 and interpreted according to the instruction set architecture of the CPU 630. Part of the instructions can also be directed to the register 732. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 734 that loads values from the register 732 and performs logical and mathematical operations on the loaded values according to the instructions. The results from these operations can be feedback into the register and/or stored in the fast memory 740. According to certain implementations, the instruction set architecture of the CPU 630 can use a reduced instruction set architecture, a complex instruction set architecture, a vector processor architecture, a very large instruction word architecture. Furthermore, the CPU 630 can be based on the Von Neuman model or the Harvard model. The CPU 630 can be a digital signal processor, an FPGA, an ASIC, a PLA, a PLD, or a CPLD. Further, the CPU 630 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 6, the data processing system 600 can include that the SB/ICH 620 is coupled through a system bus to an I/O Bus, a read only memory (ROM) 656, universal serial bus (USB) port 664, a flash binary input/output system (BIOS) 668, and a graphics controller 658. PCI/PCIe devices can also be coupled to SB/ICH 688 through a PCI bus 662.

The PCI devices may include, for example, Ethernet adapters, add-in cards, and PC cards for notebook computers. The Hard disk drive 660 and CD-ROM 666 can use, for example, an integrated drive electronics (IDE) or serial advanced technology attachment (SATA) interface. In one implementation the I/O bus can include a super I/O (SIO) device.

Further, the hard disk drive (HDD) 660 and optical drive 666 can also be coupled to the SB/ICH 620 through a system bus. In one implementation, a keyboard 670, a mouse 672, a parallel port 678, and a serial port 676 can be connected to the system bus through the I/O bus. Other peripherals and devices that can be connected to the SB/ICH 620 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 8:
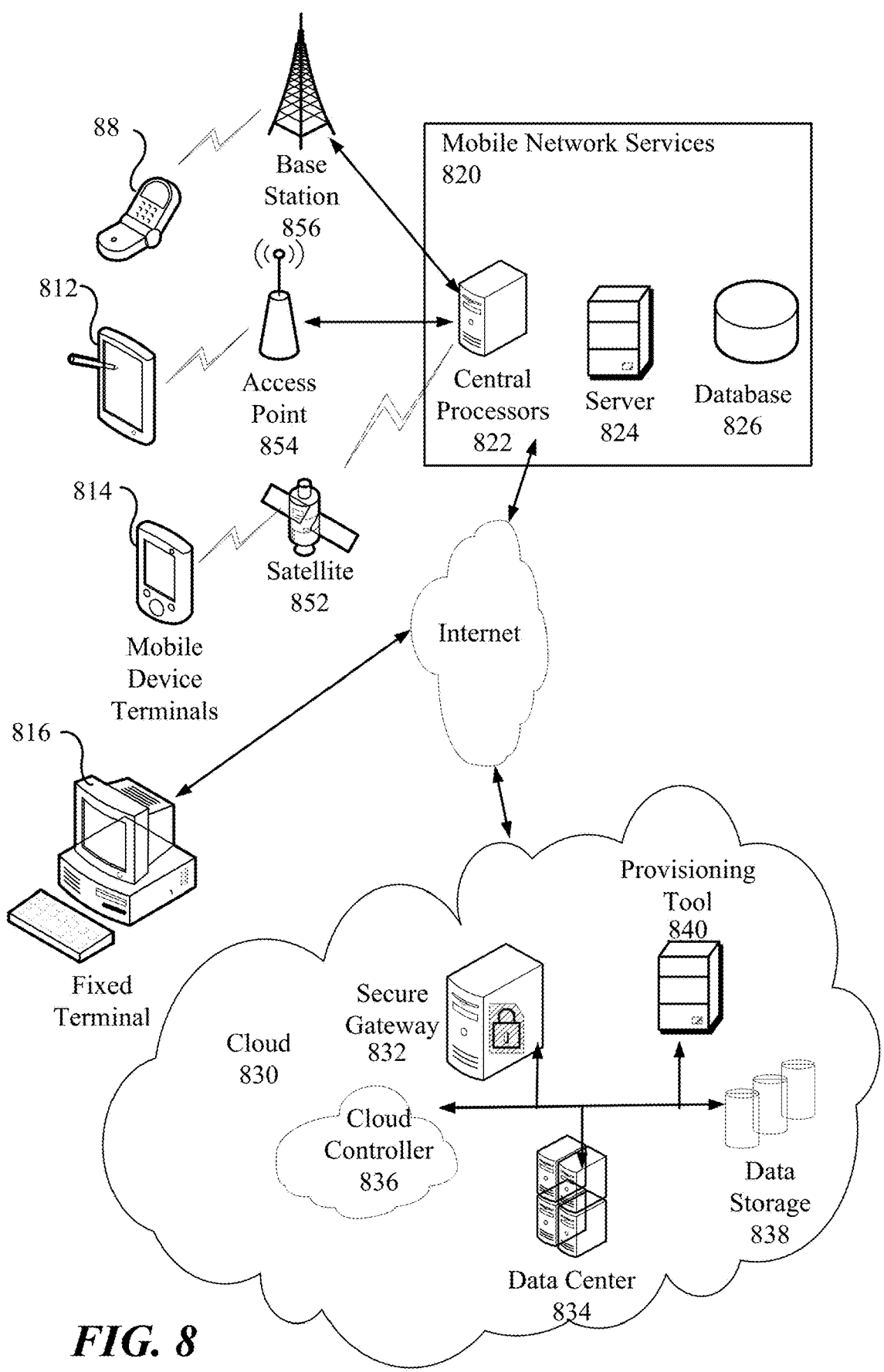
FIG. 8 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 8, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on units or hardware not identical to those described. Accordingly, other implementations are within the scope that may be claimed.

The above-described hardware description is a non-limiting example of corresponding structure for performing the functionality described herein.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A host mapping system configured to update a region of a host map based on sensor data received from a plurality of connected vehicles travelling in the region, comprising:
   a transceiver configured to receive location area signals from the plurality of connected vehicles travelling in the region;
   a computing processing unit (CPU) including processing circuitry configured to execute program instructions stored on a computer-readable medium, causing the processing circuitry to:
   monitor vehicle traffic activity in the region based on the location area signals;
   determine whether a discrepancy exists between the vehicle traffic activity and expected vehicle traffic activity based on the host map;
   when no discrepancy exists, continue monitoring vehicle traffic activity;
   when a discrepancy exists, determine a map area of the discrepancy and determine a first schedule for requesting first sensor data from the plurality of connected vehicles;
   surround the map area of the discrepancy with a first geo-fence, wherein the first geo-fence is configured to activate based on the first schedule;
   receive an alert when a connected vehicle enters the first geo-fence;
   transmit the first geo-fence to the connected vehicle;
   request that the connected vehicle transmit the first sensor data while travelling in the map area of the first geo-fence;
   receive the first sensor data from each connected vehicle travelling in the map area of the first geo-fence;
   compare the first sensor data to the first geo-fenced area of the map;
   identify the discrepancy;
   update the host map; and
   transmit the update to the plurality of connected vehicles travelling in the map region.

2. The host mapping system of claim 1,
   wherein the processing circuitry is configured to monitor a volume of the vehicle traffic to determine at least one time of day in which the volume is greater than a first traffic volume threshold;
   wherein the processing circuitry is configured to monitor the volume of the vehicle traffic to determine at least one day of the week in which the volume is greater than a second traffic volume threshold; and
   wherein the processing circuitry is configured to determine the first schedule based on the at least one time of day in which the volume is greater than the first traffic volume threshold and the at least one day of the week in which the volume is greater than the second traffic volume threshold.

3. The host mapping system of claim 2, wherein the processing circuitry is further configured to:
   determine a confidence level based on matching the discrepancy to a database of known discrepancies;
   compare the confidence level to a confidence level threshold;
   drop the update if the confidence level is below the confidence level threshold and update the host map when the confidence level is equal to or greater than the confidence level threshold.

4. The host mapping system of claim 3, wherein the processing circuitry is further configured to receive an alert when a connected vehicle enters the first geo-fence.

5. The host mapping system of claim 4, wherein the transceiver is configured to transmit the first geo-fence to the connected vehicle when the alert is received.

6. The host mapping system of claim 5, wherein the processing circuitry is further configured to:
   aggregate the first sensor data from the plurality of connected vehicles;
   convert the first sensor data to map data to generate additional map data;
   compare the additional map data to historical map data; and
   update the host map by adding the additional map data to the historical map data when the confidence level is equal to or greater than the confidence level threshold.

7. The host mapping system of claim 4, wherein the processing circuitry is further configured to generate a set of geographical coordinates and a set of first geo-fence parameters to the geo-fencing unit, wherein the first geo-fence parameters include the first schedule and a first notification responsiveness value, wherein the first schedule includes a time of day, a duration, a start date, an end date and a repetition value and the first notification responsiveness value defines a time period at which the transceiver receives the alerts.

8. The host mapping system of claim 7, wherein the processing circuitry is further configured to:
   surround the map area of the discrepancy with a second geo-fence, wherein the second geo-fence is smaller than the first geo-fence;
   determine a second schedule for the second geo-fence, where the second schedule is a subset of the first schedule;
   determine a second notification responsiveness value for the second geo-fence, wherein the second notification responsiveness value is less than or equal to the first notification responsiveness value;
   receive an alert when a connected vehicle enters the second geo-fence;
   transmit the second geo-fence to the connected vehicle;
   request that the connected vehicle transmit second sensor data while travelling in the map area of the second geo-fence;
   receive the second sensor data from each connected vehicle travelling in the map area of the second geo-fence;
   compare the second sensor data to the second geo-fenced area of the map;
   identify the discrepancy;
   update the host map; and
   transmit the update to the plurality of connected vehicles travelling in the map region.

9. The host mapping system of claim 8, wherein the processing circuitry is further configured to:
   request that the connected vehicle transmit sensor data at a first data rate while travelling in the map area of the first geo-fence; and
   request that the connected vehicle transmit sensor data at a second data rate while travelling in the map area of the second geo-fence, wherein the second data rate is greater than the first data rate.

10. The host mapping system of claim 9, wherein the processing circuitry is configured to request that the connected vehicle transmit first or second sensor data when in travelling in areas in which data connectivity is high and cache first or second sensor data when travelling in areas in which data connectivity is low.

11. A method for updating a region of a host map based on sensor data received from a plurality of connected vehicles travelling in the region, comprising:
   receiving location area signals from the plurality of connected vehicles travelling in the region;
   monitoring, with processing circuitry, vehicle traffic activity in the region based on the location area signals;
   determining whether a discrepancy exists between the vehicle traffic activity and expected vehicle traffic activity based on the host map;
   continuing to monitor vehicle traffic activity when no discrepancy exists;
   determining a map area of the discrepancy and determine a first schedule for requesting first sensor data from the plurality of connected vehicles when a discrepancy exists;
   surrounding the map area of the discrepancy with a first geo-fence, wherein the first geo-fence is configured to activate based on the first schedule;
   receiving an alert when a connected vehicle enters the first geo-fence;
   transmitting the first geo-fence to the connected vehicle;
   requesting that the connected vehicle transmit first sensor data while travelling in the map area of the first geo-fence;
   receiving the first sensor data from each connected vehicle travelling in the map area of the first geo-fence;
   comparing the first sensor data to the first geo-fenced area of the map;
   identifying the discrepancy;
   updating the host map; and
   transmitting the update to the plurality of connected vehicles travelling in the map region.

12. The method of claim 11, further comprising:
   monitoring, with the processing circuitry, a volume of the vehicle traffic to determine at least one time of day in which the volume is greater than a first traffic volume threshold;
   monitoring, with the processing circuitry, the volume of the vehicle traffic to determine at least one day of the week in which the volume is greater than a second traffic volume threshold; and
   determining the first schedule based on the at least one time of day in which the volume is greater than the first traffic volume threshold and the at least one day of the week in which the volume is greater than the second traffic volume threshold.

13. The method of claim 12, further comprising:
   aggregating, with the processing circuitry, the first sensor data from the plurality of connected vehicles;
   converting the first sensor data to map data to generate additional map data;
   comparing the additional map data to historical map data;
   determining a confidence level based on matching the discrepancy to a database of known discrepancies;
   comparing the confidence level to a confidence level threshold;
   dropping the update if the confidence level is below the confidence level threshold and updating the host map when the confidence level is equal to or greater than the confidence level threshold.

14. The method of claim 13, further comprising:
   surrounding the map area of the discrepancy with a second geo-fence, wherein the second geo-fence is smaller than the first geo-fence;
   determining, with the processing circuitry, a second schedule for the second geo-fence, where the second schedule is a subset of the first schedule;
   determining a second notification responsiveness value for the second geo-fence, wherein the second notification responsiveness value is less than or equal to the first notification responsiveness value;
   receiving an alert when a connected vehicle enters the second geo-fence;
   transmitting the second geo-fence to the connected vehicle;
   requesting that the connected vehicle transmit second sensor data while travelling in the map area of the second geo-fence;
   receiving the second sensor data from each connected vehicle travelling in the map area of the second geo-fence;
   comparing the second sensor data to the second geo-fenced area of the map;
   identifying the discrepancy;
   updating the host map; and
   transmitting the update to the plurality of connected vehicles travelling in the map region.

15. The method of claim 14, further comprising:
   requesting that the connected vehicle transmit sensor data at a first data rate while travelling in the map area of the first geo-fence; and
   requesting that the connected vehicle transmit sensor data at a second data rate while travelling in the map area of the second geo-fence, wherein the second data rate is greater than the first data rate.

16. The method of claim 15, further comprising:
   requesting that the connected vehicle transmit the first or second sensor data when travelling in areas in which data connectivity is high and cache first or second sensor data when travelling in areas in which data connectivity is low.

17. A non-transitory computer readable medium having instructions stored therein that, when executed by one or more processors, cause the one or more processors to perform a method for updating a region of a host map based on sensor data received from a plurality of connected vehicles travelling in the region, comprising:
   receiving location area signals from the plurality of connected vehicles travelling in the region;
   monitoring, with processing circuitry, vehicle traffic activity in the region based on the location area signals;
   determining whether a discrepancy exists between the vehicle traffic activity and expected vehicle traffic activity based on the host map;
   continuing to monitor vehicle traffic activity when no discrepancy exists;
   determining a map area of the discrepancy and determine a first schedule for requesting first sensor data from the plurality of connected vehicles when a discrepancy exists;
   surrounding the map area of the discrepancy with a first geo-fence, wherein the first geo-fence is configured to activate based on the first schedule;
   receiving an alert when a connected vehicle enters the first geo-fence;
   transmitting the first geo-fence to the connected vehicle;
   requesting that the connected vehicle transmit first sensor data while travelling in the map area of the first geo-fence;
   receiving the first sensor data from each connected vehicle travelling in the map area of the first geo-fence;

comparing the first sensor data to the first geo-fenced area of the map;
identifying the discrepancy;
updating the host map; and
transmitting the update to the plurality of connected vehicles travelling in the map region.

18. The non-transitory computer readable medium method of claim 17, further comprising:
monitoring, with the processing circuitry, a volume of the vehicle traffic to determine at least one time of day in which the volume is greater than a first traffic volume threshold;
monitoring, with the processing circuitry, the volume of the vehicle traffic to determine at least one day of the week in which the volume is greater than a second traffic volume threshold; and
determining the first schedule based on the at least one time of day in which the volume is greater than the first traffic volume threshold and the at least one day of the week in which the volume is greater than the second traffic volume threshold.

19. The non-transitory computer readable medium method of claim 18, further comprising:
aggregating, with the processing circuitry, the first sensor data from the plurality of connected vehicles;
converting the first sensor data to map data to generate additional map data;
comparing the additional map data to historical map data;
determining a confidence level based on matching the discrepancy to a database of known discrepancies;
comparing the confidence level to a confidence level threshold;
dropping the update if the confidence level is below the confidence level threshold and updating the host map when the confidence level is equal to or greater than the confidence level threshold.

20. The non-transitory computer readable medium method of claim 19, further comprising:
surrounding the map area of the discrepancy with a second geo-fence, wherein the second geo-fence is smaller than the first geo-fence;
determining, with the processing circuitry, a second schedule for the second geo-fence, where the second schedule is a subset of the first schedule;
determining a second notification responsiveness value for the second geo-fence, wherein the second notification responsiveness value is less than or equal to the first notification responsiveness value;
receiving an alert when a connected vehicle enters the second geo-fence;
transmitting the second geo-fence to the connected vehicle;
requesting that the connected vehicle transmit second sensor data while travelling in the map area of the second geo-fence;
receiving the second sensor data from each connected vehicle travelling in the map area of the second geo-fence;
comparing the second sensor data to the second geo-fenced area of the map;
identifying the discrepancy;
updating the host map; and
transmitting the update to the plurality of connected vehicles travelling in the map region.

\* \* \* \* \*